United States Patent [19]

Amrhein

[11] Patent Number: 4,616,675
[45] Date of Patent: Oct. 14, 1986

[54] SOLENOID-ACTUATED DIRECTIONAL CONTROL VALVE

[75] Inventor: Reinhard Amrhein, Frammersbach, Fed. Rep. of Germany

[73] Assignee: Mannesmann Rexroth GmbH, Lohr, Fed. Rep. of Germany

[21] Appl. No.: 704,542

[22] Filed: Feb. 22, 1985

[30] Foreign Application Priority Data

Feb. 23, 1984 [DE] Fed. Rep. of Germany ....... 3406570

[51] Int. Cl.⁴ .............................................. F16K 47/00
[52] U.S. Cl. ........................... 137/625.65; 137/625.69; 137/625.34; 251/50; 251/129.15
[58] Field of Search .............. 251/50, 54, 137, 129.15; 137/625.65, 625.69, 625.34

[56] References Cited

U.S. PATENT DOCUMENTS 3,701,366 10/1972 Tirelli et al. .................. 137/625.65
3,924,655 12/1975 Schwerin ..................... 137/596.13
4,056,119 11/1977 Allen .............................. 137/315

FOREIGN PATENT DOCUMENTS 503347  4/1939  United Kingdom ............... 251/137
2124736A 2/1984 United Kingdom .......... 137/625.65

Primary Examiner—Samuel Scott
Assistant Examiner—Allen J. Flanigan
Attorney, Agent, or Firm—Cushman, Darby & Cushman

[57] ABSTRACT

A three chambered solenoid-actuated directional control valve in which a spool is reciprocally mounted for movement within a valve housing. The housing and spool define the three chambers with one adapted to be connected to a pump for supplying hydraulic fluid, the second adapted for connection to a first load and the third adapted to connection to a second load. A solenoid is reciprocally mounted for movement along the direction of the bore for actuating the spool with a rod fixedly mounted to the armature of the solenoid. At least one groove is formed between the outer surface of the armature and the inner bore of the valve housing for conducting flow of hydraulic fluid between a recess at the end of the solenoid adjacent the three chambers and the end remote therefrom. A throttle in the form of a single cross wall having either a groove or bore extending therethrough dampens movement of the armature to reduce pressure peaks during switching. Throttle grooves are also provided on the lands of the spool.

7 Claims, 5 Drawing Figures

SOLENOID-ACTUATED DIRECTIONAL CONTROL VALVE

DESCRIPTION

1. Technical Field

This invention relates generally to solenoid-actuated directional control valves and more particularly to a solenoid-actuated directional control valve of the type having three chambers.

2. Background Art

Many types of solenoid-actuated directional control valves are known and frequent attempts were made to design such a valve so that few disadvantages occur. One of the problems inherent to a solenoid-actuated directional control valve is the occurrence of pressure peaks and pressure shocks, particularly if the valve is switched between operating positions due to the energization of a solenoid used to actuate the directional control valve. Inasmuch as solenoid-actuated directional control valves tend to be manufactured in large numbers, considerations regarding the cost of manufacture are of great importance.

In German Offenlegungsschrift No. 21 29 183, a solenoid-actuated directional control valve having three chambers is disclosed. The armature of the solenoid of said valve is provided with channels having a predetermined cross section. Said channels are adapted to allow during movement of the armature that oil passes through said channels at a predetermined rate. Also, means are provided to adjust the predetermined cross section of said channels. The channels are in the form of bores which extend along the entire length of the armature and are consequently difficult to manufacture. Also, replaceable sleeves are provided in said channels. Specifically, however, the entire dampening effect for the valve has to be provided for by the armature of the solenoid. The mentioned dampening measures will not be sufficient to obtain a degree of dampening which is required for cancelling pressure shocks in valves having a small displacement of the control spool and a small control spool opening.

Another solenoid-actuated directional control valve is described in German Pat. No. 29 05 943, a patent which issued to the assignee of the present invention and with the inventor being the same as the inventor of the present invention. The valve of this invention is a so-called 3-chamber valve, i.e., a valve which can be manufactured at less cost than a valve of the so-called 5-chamber type. A separate dampening piston is provided outside the housing of the valve proper and actually requires an additional housing mounted on the housing of the valve. Throttling orifices are provided in conjunction with check valves which are connected to the spaces provided at opposite sides of said piston. Also, the housing for the dampening piston has to be sealed with respect to the housing of the valve.

The following references basically relate to solenoid-actuated directional control valves of the 5-chamber type, i.e., of a type which inherently requires more time and consequently cost during the manufacturing process.

German Offenlegungsschrift No. 27 25 917 discloses such a 5-chamber valve in which throttling means are provided in connection with spring chambers from which hydraulic fluid may be displaced via one of said throttling means. This valve requires high cost during manufacture. Also, in designing this valve, one cannot rely on components already used for other valve types.

European Patent Application No. 82301087.1 (publication No. 0061842) relates to a solenoid-actuated directional control valve of the 5-chamber type. Dampening elements are provided at both ends of the valve spool. Said dampening elements are adapted to more fluid between the appropriate dampening chambers during the reciprocal movement of the valve spool in case one of the solenoids is actuated. The movement of the fluid caused by the dampening elements results in a dampening effect of the spool movement. A transfer loop is provided in the valve body connecting the cushioning or dampening chambers so that a relatively complicated and costly design is obtained.

German Offenlegungsschrift No. 23 43 662 shows a solenoid-actuated directional control valve of the 5-chamber type. Also, applicant's German Offenlegungsschrift No. 27 54 878 discloses a directional control valve of the 5-chamber type. Both said documents make use of a spool having lands which are provided with throttling means having a triangular cross section. Apart from the high cost involved in the manufacture of a valve of the 5-chamber type, no perfect avoidance of the undesired disadvantages of the pressure peaks is achieved.

Another directional control valve of the 5-chamber type is disclosed in German Offenlegungsschrift No. 25 06 864 with throttling means being provided in the armature of the solenoids alone. The 5-chamber design causes high cost of manufacture.

Applicant's German Offenlegungsschrift No. 31 41 705 discloses only throttling means provided at the outer surface of an armature. No well-defined throttling effect is obtained.

The present invention is directed to overcoming one or more of the problems as set forth above.

DISCLOSURE OF THE INVENTION

In one aspect of the present invention, a solenoid-actuated directional control valve is disclosed comprising three chambers defined by the valve housing and the spool reciprocally mounted within a bore of said housing. Throttling means are provided on the spool as well as motion damping means at the armature of the solenoid.

In accordance with a preferred embodiment of the invention, the motion damping means provided at the armature of the solenoid are provided in the form of throttling grooves located in the outer surface of the armature. Preferably, the throttling grooves are provided in a cross or end wall of the armature, with said end wall being defined by one or two or more grooves which do not have a throttling effect.

BRIEF DESCRIPTION OF THE DRAWINGS

Other objects and advantages of the invention will become apparent upon reading the following detailed description and upon reference to the drawings, in which:

FIG. 4 is an end-view of armature 15 of a preferred embodiment seen from arrow Y in FIG. 5;

Figure 1:
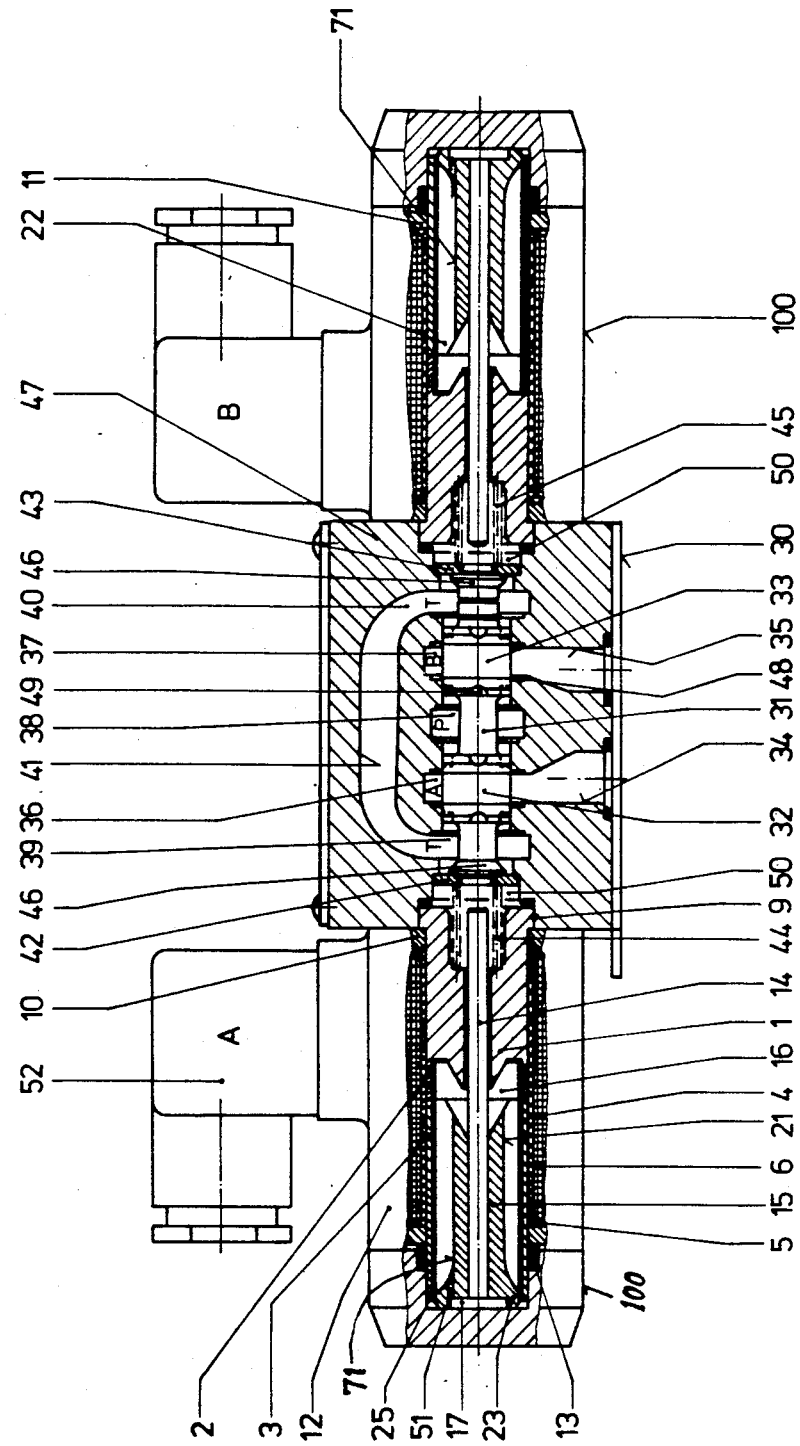
FIG. 1 is a diagrammatic longitudinal cross-sectional view of a solenoid-actuated valve in accordance with the first embodiment.

The following description of the invention is with respect to a valve which has the form of a 4/3-directional control valve. It is a valve of the so-called 3-chamber type. For the actuation of said 4/3-directional control valve 30 two solenoids 100 are provided which are oppositely mounted on said valve 30. So as to achieve a smooth operation of the valve and reasonable cost in manufacturing the same, the invention makes use of the 3-chamber design and provides for motion damping means including throttle means 51, 91 in the armature 15 of the solenoid 100 as well as fine control grooves in the spool of the valve itself. The invention is particularly useful in connection with a 4/3-directional control valve. However, the man skilled in the art does realize that significant advantages will also be achieved when using the invention together with other valves of the 3-chamber type. This is also true if instead of using two solenoids only one solenoid is used for actuating the valve.

After this summarizing disclosure of the invention a detailed description of the drawings will now follow:

FIG. 1 shows a sectional view in longitudinal direction of a 4/3-directional control valve 30 in its neutral position. Valve 30 comprises three chambers which will be described below in some detail. Two solenoids 100 are shown in a partial sectional view. The two solenoids 100 are oppositely mounted on the valve housing 47 of valve 30 and are adapted to actuate the valve spool 31.

The two solenoids 100 are identical in design and therefore only one solenoid 100 is described in detail. Reference will be made to the solenoid 100 on the left-hand side in FIG. 1. The basic design of solenoid 100 is known from German Offenlegungsschrift No. 31 41 705. In FIG. 1 the solenoid 100 is shown in its not-energized condition, i.e. an armature 15 of solenoid 100 is in its left-most position and an actuating rod 15 connected to said armature 15 does not abut against the spool 31 of valve 30.

Solenoid 100 comprises a first or housing member 1. Arranged adjacent to said housing member 1 is a tubular member 2 which is placed in alignment with said tubular member 2. Also a tubular end member 3 is provided. A gap forming tube 4 is arranged at the inner surface of the member 2 and the end member 3 and extends from the housing member 1 to the free end of end member 3.

A magnet coil 6 surrounds housing member 1, member 2 and at least partially the gap-forming tube 4. Coil 6 may be energized in a known manner from the outside by supplying a current via a connector member 52 arranged on the solenoid housing 12 yet to be described. A coil body 5 is provided for receiving the coil 6 and supporting rings 10 and 11 (for ring 11 see the solenoid 100 on the right-hand side) are intended to hold the coil body 5 in its place. Supporting ring 10 may form a part of solenoid housing 12. The solenoid housing 12 may also be called a second housing member in contrast to the alrady mentioned first housing member 1. The solenoid housing 12 is arranged on the free end of end member 3, i.e. in FIG. 1 the left end of said end member 3.

Sealing means 13 are provided between the support ring 11 and the housing member 12.

The actuating rod 14 is reciprocally mounted in a bore of housing member 1. At the left end (see FIG. 1) of the actuating rod 14 which extends out of the housing member 1 the armature 15 is fixedly mounted. The armature 15 is reciprocally mounted within the gap-forming tube 4. The armature 15 divides the space defined by gap-forming tube 4 into two divisional spaces 16 and 17, the size of each of which depends upon the position in which the armature 15 is placed. The support provided for the actuating rod 14 by the housing member 1 is provided with a certain degree of play such that a fluid, specifically a hydraulic oil may flow from the valve 30 to the divisional spaces 16 and 17.

The armature 15 has the shape of a hollow cylinder with the hollow space of said hollow cylinder being adapted to receive and fixedly mount the actuating rod 14. Facing towards the housing member 1 the armature 15 is provided with a cone-shaped flairing recess, a recess into which a correspondingly designed projection of the housing member 1 will fit.

At its outer circumferential surface armature 15 is provided with one or a plurality of longitudinal grooves. Preferably the armature 15 is provided as is shown with two oppositely arranged longitudinal grooves 21 and 71. The longitudinal groove 21 and 71 start at the end of the armature 15 which faces towards the housing member 1 and they extend towards the other end of the armature 15 up to an end wall 23 formed by said armature 15. The end wall 23 forms together with the inner surface of the gap-forming tube 4 a throttle means 25. Oppositely arranged with respect to end or cross wall 23, the armature 15 forms another cross wall 22 (see the solenoid 100 arranged in the right-hand part of FIG. 1). Cross wall 22 is penetrated by said grooves 21 and 71 and therefore presents for all practical purposes no resistance for the fluid, i.e. the connection between the grooves 21, 71 and the divisional space 16 does not present any resistance for the fluid.

The size of the throttle means 25 is defined by the bearing or mounting play between the armature 15 and the gap-forming tube 4. Therefore, the amount of throttling depends on the tolerances between the armature 15 and the pole or gap-forming tube 4. This means that the throttling effect generated by the throttle means 25 is generally not clearly defined.

In accordance with the invention at least one of said longitudinal grooves 21, 71 is connected with the divisional space 17 by means of a throttle bore which penetrates cross wall 23. In the embodiment shown in FIG. 1 only longitudinal groove 71 is connected with divisional space 17 by means of a throttle bore 51.

The throttle bore 51 comprises a well-defined cross section. For instance the cross-section of the throttle bore 51 may be 1 mm. Further, the throttle bore 51 is relatively short in length. The throttle bore 51 extends through cross wall 23 which has a relatively small thickness. The throttle bore 51 is preferably arranged in alignment with the bottom of groove 71 and extends in axial direction.

In practice throttle means 25 and throttle bore 51 are arranged in parallel and the amount or size of the throttling effect of the throttle means 25 and the throttle bore 51 is selected such that the throttling effect of the throttling means 25 is for all practical purposes negligible with respect to the degree of throttling caused by the throttle bore 51. Therefore, one will achieve all in all a well-defined amount or degree of throttling.

The amount of throttling may be further changed by the selection of the number of throttle bores 51 as well as by changing the diameter and/or the length of said throttle bores.

Figure 5:
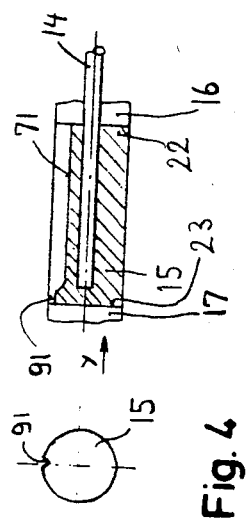
FIG. 5 is a schematic cross-sectional view of the armature of a preferred embodiment of the invention.

FIGS. 4 and 5 disclose the preferred embodiment of the invention. Instead of using throttle bores 51 it is most desirable to use one or more throttle grooves. The embodiment of FIGS. 4 and 5 shows that one throttle groove 91 is provided in the cross wall 23 of armature 15. Throttling groove 91 provides a throttling effect for the fluid moving between divisional spaces 16 and 17. One longitudinal groove 71 of the type described above is provided in alignment with the single throttle groove 91. More than just one throttle groove 91 may be utilized. Also, the throttle groove 91 could be placed in the outer circumference of end wall 26. The throttle groove 91 can be manufactured at less cost than throttle bores.

So as to obtain a smooth switching operation for the valve 30, the invention provides so-called fine control grooves 59 at the spool 31 of the valve 30 yet to be described in detail.

Valve 30 is, as was already mentioned, a 4/3-directional control valve of the type having three chambers. The valve 30 comprises a valve housing 47 having a centrally arranged bore within which the valve spool 31 is reciprocally mounted. The spool 31 comprises two lands 32 and 33 adapted to slide along the inner surface of the central bore of valve housing 47. From said inner surface of the central bore extend radially outwardly three recesses 36, 37 and 38. Said recesses 36, 37 and 38 are closed in the shown neutral position of the valve 30 and actually form three chambers. Therefore, this type of a valve is called a 3-chamber valve. Recess 36 may also be called a load recess and is connected with a load conduit 34 so as to provide a connection with a load A not shown. Recess 37 is adapted to be connected with a not-shown load B via conduit 35. Recess 38 which is arranged centrally between recesses 36 and 37 is connected via a not-shown conduit with a pump P (not shown).

Diametrically opposite to each other next to recess 36 and recess 37, respectively, each one recess 39 and 40, respectively, are provided. A connecting conduit 41 connects said two recesses 39 and 40. By means of not shown conduit means, the recesses 39 and 40 are connected with a tank T (not shown).

Each of said solenoids 100 extends with the respective housing member 1 into wider openings 9 formed by the centrally located bore in valve housing 47. Seals are provided between the housing members 1 and the valve housing 47 with valve end spaces 50 being defined between housing member 1 and valve housing 47. Coil pressure springs 44 and 45 extend between each of said housing members 1 and disks 42 and 43. Said disks 42 and 43, respectively, are supported by the spool 31 and abut against an abutment land 46 of said spool. Due to the action of the two springs 44 and 45, the spool 31 will be in its neutral position shown in FIG. 1 as long as the solenoids 100 are not energized. The recesses 39 and 40, respectively, are connected for all possible positions of the spool 31 with the respective valve end spaces 50. The recesses 39 and 40 therefore do not form chambers like the chambers formed by recesses 36, 37 and 38 in combination with the valve housing 47. For this reason, the valve 30 shown in FIG. 1 is called a valve of the 3-chamber type.

Each of the two lands 32 and 33 cooperates with control edges which are formed by the valve housing 47 due to the existence of the recesses 36, 36, 38 and 39 and 40. Recesses 36, 37 and 38 form each two control edges while recesses 39 and 40 provide each one recess. For reasons of simplicity, only one of said control edges is referred to by a reference numeral. Reference numeral 48 is used to designate the control edge which cooperates with land 33.

In accordance with the present invention each of the lands 32 and 33, respectively, is provided at both sides with so-called fine control grooves 49, i.e., grooves 49 which allow for a fine control of the fluid flow. For reasons of simplifying the drawing, only reference numeral 49 is shown in FIG. 1 at a location of land 33 where also the reference numeral 48 for one of the control edges is inserted.

Depending upon the kind of use of the valve, it is conceivable to provide the fine control grooves 49 only at one side of each of said lands 32 and 33. In the embodiment of FIG. 1 the fine control grooves 49 have a semicircular shape.

Figure 3:
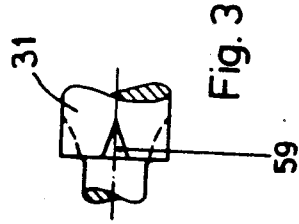
FIG. 3 is a side-view of a part of the valve spool with control grooves being differently designed than the control grooves shown in FIGS. 1 and 2.

FIG. 3 is a partial side view of the spool 31 with fine control grooves 59 of a triangular shape.

The existence of the fine control grooves 49 or 59 favorably influences the opening characteristic of the spool 31. The fine control grooves 49 or 59 in the spool 31 provide in combination with the already mentioned throttling openings 51 and preferably in combination with the above mentioned throttling groove(s) 91 in cross wall 23 a sinificant and desirable reduction of pressure peaks which otherwise would occur in directional control valves. Such pressure peaks have the disadvantage that noisy sound effects are created and high rates of acceleration occur at the loads, e.g. the hydraulic cylinders. These disadvantages are avoided by the invention, and, because of the use of a valve having only three chambers the manufacturing costs are reduced.

Figure 2:
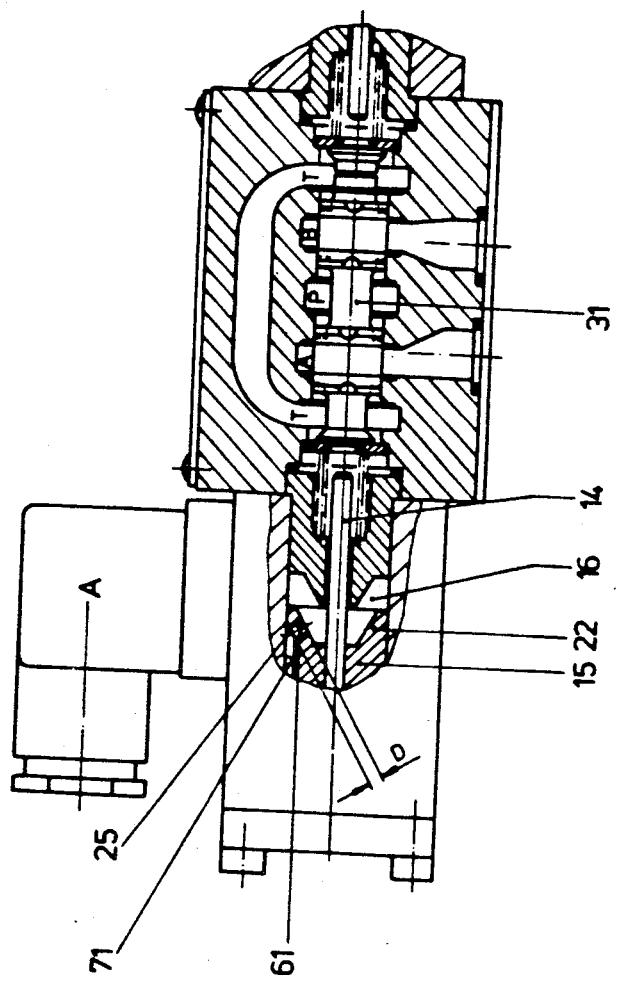
FIG. 2 is a sectional view similar to FIG. 1 but of a second embodiment of a solenoid-actuated valve wherein the location of the throttle means was changed.

FIG. 2 discloses another embodiment of a solenoid-actuated directional control valve. According to this embodiment, a throttle bore 61 is provided in the cross wall 22. FIG. 2 discloses further the possibility that only one longitudinal groove 71 is provided in the armature 15. In accordance with FIG. 2, longitudinal groove 71 extends—even though this is not clearly shown in FIG. 2—across the entire length of the armature 15 and penetrates the end wall 23 (not shown) without a throttle bore being provided in end wall 23. In fact, it is throttle bore 61 which substantially determines the degree of throttle. The effect of the throttle means 25 is again negligible with respect to the effect of the throttle bore 61. The length D of the throttle bore 61 is relatively short.

In accordance with a preferred embodiment, throttle bore 61 in the embodiment of FIG. 2 could be replaced by a groove provided in the outer surface of cross wall 22, i.e., the surface which is in contact with the gap forming tube 4. Please see the above description of FIGS. 4 and 5.

It should be noted that the presence of the throttle bores 51 or 61 or the grooves 91 in any one of said end walls 22 and/or 23 will provide for the required air bleed function for the hydraulic oil.

While the operation of the present invention is believed clearly apparent from the foregoing description, further amplification will be made in the following brief summary of the operation.

Assuming that in FIG. 1 the left solenoid 100 is energized, a movement of the armature 15 towards the right is effected. Inasmuch as the actuating rod 14 is fixedly mounted to the armature 15, the actuating rod 14 would also be moved towards the right. As a consequence of the rightward movement, the oil being present in divisional space 16 will pass through the longitudinal grooves 21 and 71 and also through the throttle bore 51 so as to arrive in the divisional space 17. Because of the throttle effect caused by throttle bore 51, the speed of movement of the armature 15 is slowed down. This is due to the fact that the actuating rod 14 will move the spool 31 of the valve with a slower speed towards the right (see FIG. 1). At the same time, when the spool 30 is moved, the presence of the fine control grooves 59 will provide for a gradual connection between the recess 38 connected with pump P and the recess 37 connected with load A. Both the above effects together provide for a somewhat delayed switching operation so that a smooth switching operation can be realized. Pressure peaks with the resulting disadvantages are avoided. De-energization of the left solenoid 100 will allow spring 45 to bring the spool 31 back into the shown neutral position. An energization of the right solenoid 100 will similarly provide for the opposite switching operation as is well-known to a man skilled in the art.

What is claimed is:

1. A three chamber solenoid-actuated directional control valve comprising:

a valve housing having a bore extending longitudinally therethrough;

a spool having at least one land thereon reciprocally mounted within said bore and defining with said housing, between first and second ends of said spool, three chambers, a first chamber being adapted to be connected to a pump for supplying hydraulic fluid, a second chamber being adapted to be connected to a first load and a third chamber being adapted to be connected to a second load and defining with said housing at least one recess adapted for connection to a tank and located between one of said ends and said chambers;

throttle means on said at least one land between at least one chamber and said recess;

solenoid means in said spool including a solenoid housing having an inner bore surface defining a bore extending therethrough along said bore direction from said one end of said spool, an armature reciprocally mounted for longitudinal movement along said bore direction in response to actuation of said solenoid means, and an actuating rod fixedly mounted to said armature for actuating said spool when said solenoid means is actuated, a space being defined between the end of said armature remote from said spool and said valve housing and at least one armature groove being formed between the outer surface of said armature and said inner bore surface of said solenoid housing and connected to said recess; and motion damping means including at least a single cross wall between said space and said groove adjacent said remote armature end and having a throttling groove between said cross wall and said inner bore surface for dampening movement of said armature to reduce pressure peaks during switching.

2. A valve as in claim 1 wherein a second recess is defined with said valve housing between the other end of spool end and said chambers and including a second solenoid means extending from the other end of said spool.

3. A valve as in claim 1 wherein said motion damping means includes at least two oppositely arranged cross walls with said groove is provided one cross wall.

4. A valve as in claim 3 wherein said groove is provided in the cross wall which is furthest from said inner bore surface.

5. A valve as in claim 1 further including further throttle means including a first land between said first and second chambers with control grooves at the edge thereof and a second land between said second and third chambers with control grooves at the edge thereof.

6. A valve as in claim 5 wherein said control grooves have a circular cross section.

7. A valve as in claim 5 wherein said control grooves have a triangular cross section.

* * * * *